United States Patent
Meyer et al.

(10) Patent No.: US 10,487,208 B2
(45) Date of Patent: Nov. 26, 2019

(54) FLAME-RETARDANT MOLDING COMPOUNDS CONTAINING SILOXANE-CONTAINING POLYCARBONATE BLOCK CO-CONDENSATE

(71) Applicant: Covestro Deutschland AG, Leverkusen (DE)

(72) Inventors: Alexander Meyer, Düsseldorf (DE); Klaus Horn, Dormagen (DE); Timo Kuhlmann, Leichlingen (DE); Ulrich Liesenfelder, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/544,282

(22) PCT Filed: Jan. 18, 2016

(86) PCT No.: PCT/EP2016/050876
§ 371 (c)(1),
(2) Date: Jul. 18, 2017

(87) PCT Pub. No.: WO2016/116395
PCT Pub. Date: Jul. 28, 2016

(65) Prior Publication Data
US 2018/0009986 A1  Jan. 11, 2018

(30) Foreign Application Priority Data

Jan. 20, 2015  (EP) .................................... 15151810

(51) Int. Cl.
*C08L 83/10* (2006.01)
*C08K 5/02* (2006.01)
(Continued)

(52) U.S. Cl.
CPC ................ *C08L 83/10* (2013.01); *C08K 5/02* (2013.01); *C08K 5/42* (2013.01); *C08L 27/18* (2013.01);
(Continued)

(58) Field of Classification Search
CPC .... C08L 83/10; C08L 2201/02; C08G 77/448
(Continued)

(56) References Cited

U.S. PATENT DOCUMENTS 3,189,662 A   6/1965  Vaughn, Jr.
3,419,634 A   12/1968 Vaughn, Jr.
(Continued)

FOREIGN PATENT DOCUMENTS

DE   3334782 A1   10/1984
DE   19710081 A1   9/1998
(Continued)

OTHER PUBLICATIONS

On-line public literature on PTFE (http://www.sympatec.com/en/application/ptfe/). May 31, 2018 printed.*
(Continued)

*Primary Examiner* — William K Cheung
(74) *Attorney, Agent, or Firm* — Drinker Biddle & Reath LLP

(57) ABSTRACT

The present invention relates to flame-retardant moulding compositions comprising siloxane-containing polycarbonate block cocondensate, and also to a process for the production of these moulding compositions. The invention further relates to the use of these flame-retardant moulding compositions in injection-moulding and extrusion applications.

14 Claims, 1 Drawing Sheet

(51) Int. Cl.
*C08K 5/42* (2006.01)
*C08L 27/18* (2006.01)
*C08L 69/00* (2006.01)
*C08G 77/448* (2006.01)
*C08K 3/22* (2006.01)

(52) U.S. Cl.
CPC ............ *C08L 69/00* (2013.01); *C08G 77/448* (2013.01); *C08K 2003/2237* (2013.01); *C08L 2201/02* (2013.01); *C08L 2207/53* (2013.01)

(58) Field of Classification Search
USPC .................................................. 528/31, 196
See application file for complete search history.

(56) References Cited

U.S. PATENT DOCUMENTS

| | | | |
|---|---|---|---|
| 4,584,360 | A | 4/1986 | Paul et al. |
| 4,707,393 | A | 11/1987 | Vetter |
| 4,994,510 | A | 2/1991 | Naar et al. |
| 5,227,449 | A | 7/1993 | Odell et al. |
| 5,288,778 | A | 2/1994 | Schmitter et al. |
| 5,334,358 | A | 8/1994 | Schuchardt et al. |
| 5,414,054 | A | 5/1995 | Jonsson et al. |
| 5,510,414 | A | 4/1996 | Okamoto et al. |
| 5,821,321 | A | 10/1998 | Archey et al. |
| 5,821,380 | A | 10/1998 | Holderbaum et al. |
| 5,846,659 | A | 12/1998 | Löwer et al. |
| 5,883,165 | A | 3/1999 | Kröhnke et al. |
| 6,066,700 | A | 5/2000 | König et al. |
| 6,323,280 | B1 | 11/2001 | Paul et al. |
| 6,657,018 | B1 | 12/2003 | Hoover |
| 7,728,059 | B2 | 6/2010 | Chen et al. |
| 8,044,122 | B2 | 10/2011 | Ruediger et al. |
| 8,158,745 | B2 | 4/2012 | Wehrmann et al. |
| 2007/0072960 | A1 | 3/2007 | Ma et al. |
| 2007/0191519 | A1 | 8/2007 | Jiao et al. |
| 2008/0081884 | A1 | 4/2008 | Glasgow et al. |
| 2008/0081893 | A1* | 4/2008 | Hoover ................ C08G 64/186 528/31 |
| 2013/0224462 | A1 | 8/2013 | van der Mee et al. |
| 2013/0267665 | A1 | 10/2013 | Huggins et al. |
| 2013/0313493 | A1 | 11/2013 | Wen et al. |
| 2014/0226342 | A1 | 8/2014 | Flores et al. |
| 2014/0329920 | A1 | 11/2014 | Rosenquist |

FOREIGN PATENT DOCUMENTS

| | | |
|---|---|---|
| DE | 10311063 A1 | 9/2004 |
| DE | 102007011069 A1 | 9/2008 |
| DE | 102008019503 A1 | 10/2009 |
| EP | 0110221 A2 | 6/1984 |
| EP | 0110238 A2 | 6/1984 |
| EP | 122535 A2 | 10/1984 |
| EP | 0460466 A1 | 12/1991 |
| EP | 0 500 496 A1 | 8/1992 |
| EP | 0524731 A1 | 1/1993 |
| EP | 0716919 A2 | 6/1996 |
| EP | 0839623 A1 | 5/1998 |
| EP | 1308084 A1 | 5/2003 |
| WO | WO-9615102 A2 | 5/1996 |
| WO | WO-2008060724 A1 | 5/2008 |
| WO | WO-2013067684 A1 | 5/2013 |

OTHER PUBLICATIONS

International Search Report for PCT/EP2016/050876 dated Feb. 11, 2016.
International Search Report for PCT/EP2016/050913 dated Feb. 23, 2016.
Written Opinion of the International Searching Authority for PCT/EP2016/050876 dated Feb. 11, 2016.
Written Opinion of the International Searching Authority for PCT/EP2016/050913 dated Feb. 23, 2016.

* cited by examiner

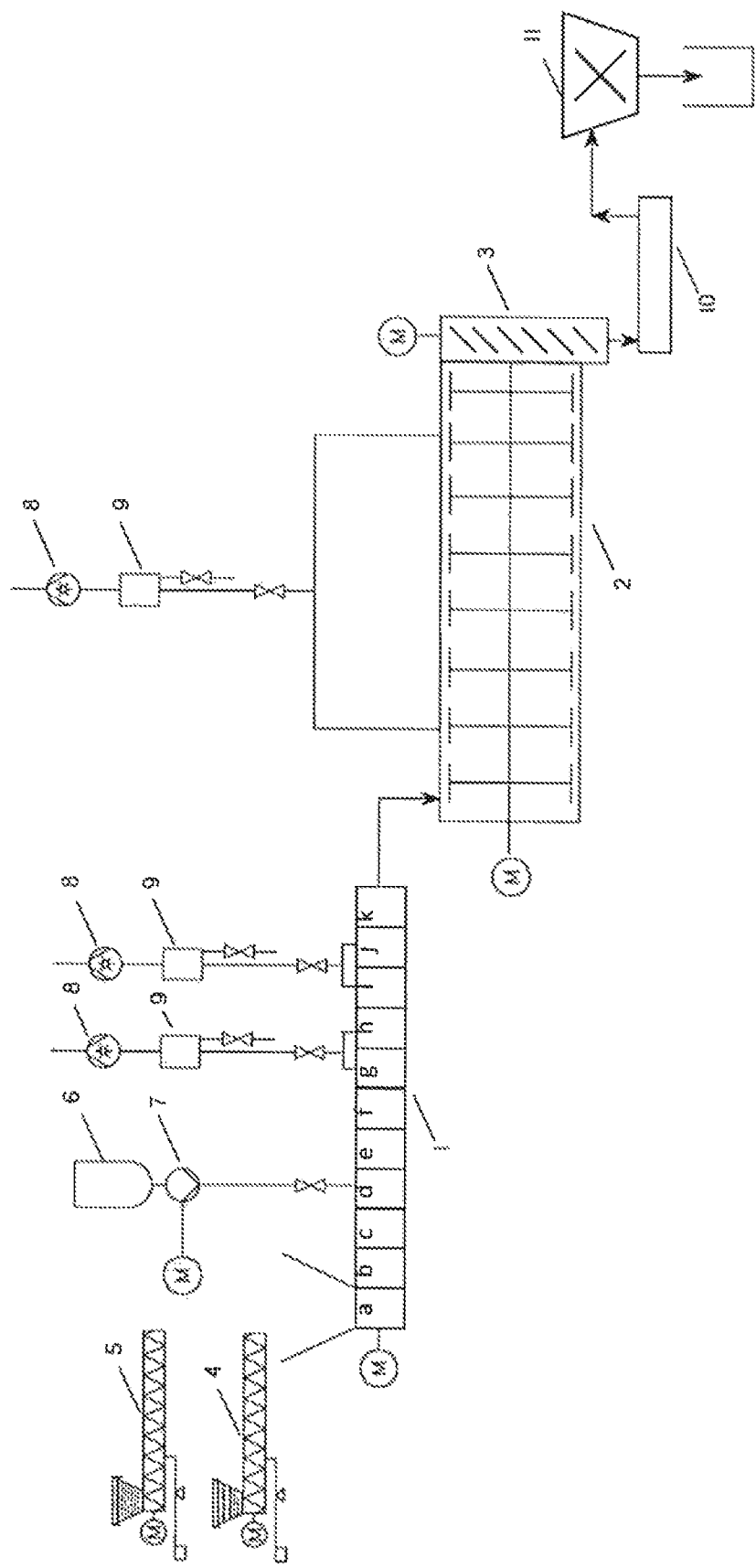

FLAME-RETARDANT MOLDING COMPOUNDS CONTAINING SILOXANE-CONTAINING POLYCARBONATE BLOCK CO-CONDENSATE

CROSS-REFERENCE TO RELATED APPLICATIONS

This application is a national stage application (under 35 U.S.C. § 371) of PCT/EP2016/050876, filed Jan. 18, 2016, which claims benefit of European Application No. 15151810.7, filed Jan. 20, 2015, both of which are incorporated herein by reference in their entirety.

The present invention relates to flame-retardant moulding compositions comprising siloxane-containing polycarbonate block cocondensate, and also to a process for the production of these moulding compositions. The invention further relates to the use of these flame-retardant moulding compositions in injection-moulding and extrusion applications.

BACKGROUND OF THE INVENTION

It is known that polysiloxane-polycarbonate block cocondensates have good properties in relation to low-temperature (notched) impact resistance, chemicals resistance and outdoor weathering resistance, and also good ageing properties and flame retardancy. In terms of these properties they are sometimes superior to conventional polycarbonates (homopolycarbonate based on bisphenol A).

Industrial production of these cocondensates mostly proceeds from the monomers by way of the interfacial process with phosgene. It is moreover known that these siloxane cocondensates can be produced by way of the melt transesterification process with use of diphenyl carbonate. These processes have the disadvantage that the plants used are used for the production of standard polycarbonate, and are therefore large. Production of specialized block cocondensates in these plants is often uneconomic because the volume of the said products is relatively small. The starting materials, e.g. the polydimethylsiloxanes, required for the production of the cocondensates can moreover adversely affect the plant, because they can contaminate the plant or the solvent-circulation systems. The production process moreover requires toxic starting materials such as phosgene or, in the case of the melt transesterification process, has high energy consumption.

DETAILED DESCRIPTION OF THE INVENTION

Production of polysiloxane-polycarbonate block copolymers by way of the interfacial process is known from the literature and is described by way of example in U.S. Pat. Nos. 3,189,662, 3,419,634, DE-OS (German Published Specification) 3 34 782 and EP 122 535.

US 2013/0267665 discloses the production of polysiloxane-polyorgano-block copolymers with use of hydroxyaryloxy-functional siloxanes.

U.S. Pat. No. 5,227,449 describes the production of polysiloxane-carbonate block copolymers by the melt transesterification process from bisphenol, diaryl carbonate, silanol-terminated polysiloxanes and catalyst. Siloxane compounds used here are polydiphenyl- or polydimethylsiloxane telomers having terminal silanol groups. However, it is known that as chain length decreases in an acidic or basic medium, in contrast to diphenylsiloxane having terminal silanol groups, these dimethylsiloxanes having terminal silanol groups have an increasing tendency toward self-condensation, thus inhibiting incorporation into the copolymer. Cyclic siloxanes formed here remain in the polymer and have an extremely problematic effect in applications in the electrical/electronics sector.

All of these processes have the disadvantage of the use of organic solvents in at least one step of the synthesis of the silicone-polycarbonate block copolymers, the use of phosgene as starting material, or inadequate quality of the cocondensate. In particular, the synthesis of the cocondensates starting from the monomers either by the interfacial process or especially by the melt transesterification process is very complicated: in the melt process by way of example it is necessary to avoid use of high vacuum and high temperatures, in order to prevent evaporation, and thus loss, of the monomers. Only in subsequent reaction stages where oligomers with relatively high molar mass have formed, is it possible to use lower pressures and higher temperatures. This means that the reaction must be conducted in a number of stages, and that reaction times are correspondingly long.

There are also known processes that start from commercially available polycarbonates with the aim of avoiding the disadvantages described above. This is described by way of example in U.S. Pat. Nos. 5,414,054, 5,821,321 and 6,066,700. Here, a conventional polycarbonate is reacted with a specific polydimethylsiloxane in a reactive extrusion process. These processes have the disadvantage of use of high-activity transesterification catalysts which permit production of the cocondensates within short residence times in an extruder. These transesterification catalysts remain in the product, and cannot be deactivated, or can be deactivated only to an inadequate extent. Injection mouldings made of the resultant cocondensates therefore exhibit inadequate ageing performance, in particular inadequate heat-ageing performance. Specialized, and therefore expensive, siloxane blocks must moreover be used.

DE 19710081 describes a process for the production of the abovementioned cocondensates in a melt transesterification process starting from an oligocarbonate and a specific hydroxyarylsiloxane. The said application also describes the production of the oligocarbonate. However, large-scale industrial production of oligocarbonates is a very complicated approach to the production of relatively small volumes of specific cocondensates. These oligocarbonates have relatively low molecular weights and relatively high terminal OH group concentrations. Because of their low chain length, their phenolic OH concentrations are often above 1000 ppm. Materials of this type are not normally obtainable commercially, and therefore have to be produced specifically for the production of the cocondensates. However, it is uneconomic to operate large-scale industrial plants to produce small volumes of precursors. The impurities present in these precursors, for example residual solvents, residual catalysts, unreacted monomers, etc., moreover make them markedly more reactive than high-molecular-weight commercially available products based on polycarbonate. For these reasons there is no commercial availability of appropriate precursors or aromatic oligocarbonates suitable for the production of these block cocondensates. Furthermore, the process described in DE 19710081 does not permit production of the block cocondensate in short reaction times. Both the production of the oligocarbonate and the production of the block cocondensate proceed by way of a number of stages with residence times totaling well over one hour. The resultant material is moreover unsuitable for production of cocondensates because the final product has poor colour caused by the high concentration of terminal OH groups, and also by other impurities, for example residual catalyst constituents.

Polycarbonate compositions comprising siloxane-containing polycarbonate block cocondensates with good flame retardancy properties are described in the literature, for example in US 2013/0224462, US 2008/081893, US 2014/226342 and US 2008/081884.

U.S. Pat. No. 4,994,510 describes siloxane-containing block cocondensates of polycarbonate which feature good flame retardancy properties. U.S. Pat. No. 4,994,510 describes the use of defined sulphonates as flame retardants. The block cocondensate compositions described in said patent application are not a subject of the present application.

U.S. Pat. No. 6,323,280 describes compositions composed of siloxane-containing block cocondensate and defined fluorinated polyolefins. These compositions are not a subject of the present application.

EP 0524731 describes copolycarbonates comprising specific siloxane units. These specific structures are not a subject of the present application.

US 20070191519 describes mixtures of siloxane-containing block cocondensates and various salts. These specific mixtures are not a subject of the present application.

The abovementioned prior-art moulding compositions are composed of siloxane-containing block cocondensates produced by the interfacial process. In contrast to this, the present application relates to block cocondensates of specific structure which were produced by way of conventionally obtainable polycarbonates.

Nodera et al. in J. Appl. Pol. Sci. 2006, 102, 1697-1705 say that the siloxane domain size has a large effect on the fire performance of siloxane-containing block cocondensates. The block cocondensates studied by Nodera et al., like the prior-art materials cited above, are produced by the interfacial process. Siloxane domain distributions in block cocondensates produced from commercially available polycarbonates in the melt transesterification process are different from those of materials produced by the interfacial process. It was therefore not obvious that the block cocondensates—produced by the melt transesterification process—used in the present application have good fire properties.

BRIEF SUMMARY OF THE INVENTION

It was therefore an object, starting from the prior art described, to produce low-cost moulding compositions based on siloxane-containing block cocondensates, where these feature high flame retardancy and high impact resistance. The meaning of low-cost here is that the block cocondensates are not to be produced by the interfacial process, i.e. with use of phosgene, and are not to be produced directly from the monomers, for example bisphenol A and diphenyl carbonate. The intention is that the block cocondensates of the invention can by way of example be produced from polycarbonates that are in principle available commercially.

Another object of the present invention was to provide polycarbonate compositions with a combination of high toughness at low temperatures (e.g. toughness performance at −30° C. in the Izod notched impact test; the energy absorbed in the Izod notched impact test in accordance with ISO 180/1A on 80×10×3 mm or on 80×10×4 mm specimens should in this case be at least 30 kJ/m$^2$) and UL 94 V-0 flame retardancy for 1.5 mm wall thickness.

Surprisingly, it was possible to show that siloxane-containing block cocondensates produced by a melt transesterification process which have a particular concentration of PTFE/PTFE blend and of a polysulphonic salt and are characterized by a particular chlorine content feature high flame retardancy in combination with excellent low-temperature impact resistance.

The invention therefore provides flame-retardant, thermoplastic moulding compositions comprising
(A) at least one polysiloxane-polycarbonate block cocondensate comprising siloxane blocks of the structure (1)

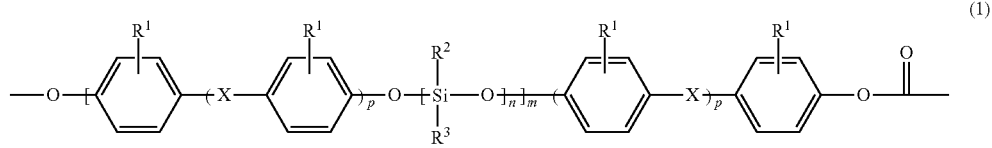

where
$R^1$ is H, Cl, Br or $C_1$ to $C_4$-alkyl, preferably H or methyl, particularly preferably H,
$R^2$ and $R^3$ are selected mutually independently from aryl, $C_1$ to $C_{10}$-alkyl and $C_1$ to $C_{10}$-alkylaryl, $R^2$ and $R^3$ preferably being methyl,
X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene, which can have been condensed with another aromatic ring comprising heteroatoms, preferably a single bond, —CO—, —O—, $C_1$- to $C_5$-alkylene, $C_2$ to $C_5$-alkylidene or $C_5$ to $C_{12}$-cycloalkylidene, particularly preferably a single bond, —O—, isopropylidene or $C_5$ to $C_{12}$-cycloalkylidene, and with particular preference isopropylidene,
n is an average number of repeating units from 1 to 500, preferably from 10 to 400, particularly preferably from 10 to 100, very particularly preferably from 20 to 60,
m is an average number of repeating units from 1 to 10, preferably from 1 to 6, particularly preferably from 2 to 5,
p is 0 or 1, preferably 0
and the product n×m is preferably a number from 12 to 400, particularly preferably from 15 to 200;
(B) from 0.03 to 0.25% by weight, preferably from 0.05 to 0.20% by weight, of polytetrafluoroethylene or from 0.05 to 0.30% by weight of polytetrafluoroethylene blends which comprise from 30 to 70% by weight of polytetrafluoroethylene, and
(C) from 0.1 to 0.6% by weight of at least one sulphonic salt,
characterized in that the chlorine content of the moulding compositions is from 10 to 1000 ppm, preferably 20 to 800 ppm, and especially preferably from 50 to 500 ppm.

The moulding compositions of the invention may further comprise (D) from 0.00% by weight to 20.00% by weight, preferably 0.05% by weight to 10.00% by weight, particularly preferably 0.10% by weight to 1.00% by weight, very particularly preferably 0.10% by weight to 0.50% by weight, and especially preferably 0.10% by weight to 0.30% by weight of at least one UV absorber; and/or (E) from 0.00% by weight to 1.00% by weight, preferably from 0.10% by weight to 0.75% by weight, particularly preferably from 0.15% by weight to 0.60% by weight, and very particularly preferably from 0.20% by weight to 0.50% by weight, of at least one mould-release agent; and/or (F) from 0.00% by weight to 0.20% by weight, preferably from 0.01% by weight to 0.10% by weight, of one or more heat stabilizers or processing stabilizers, preferably selected from the group of the phosphates, phosphines, phosphites and phenolic antioxidants, and mixtures of these; and/or (G) from 0.00 to 10.00% by weight, preferably from 0.10 to 8.00% by weight, particularly preferably from 0.20 to 3.00% by weight, of other additives which differ from components (B) to (F), preferably comprising at least one chlorine-containing colorant, and/or (H) from 0.00 to 40% by weight of one or more (co) polycarbonates which do not have any siloxane units, preferably comprising a homopolycarbonate based on bisphenol A.

The moulding compositions of the invention can comprise one or more other components in addition to components (A) to (C) and optionally one or more of components (D) to (H).

In one preferred embodiment the moulding compositions are composed of components (A) to (G).

In another preferred embodiment, the moulding compositions are composed of components A) to H).

Achievement of the effect of the invention requires at least components A) to C) and compliance with the chlorine content.

Definitions

For the purposes of the invention "$C_1$-$C_4$-alkyl" is by way of example methyl, ethyl, n-propyl, isopropyl, n-butyl, sec-butyl, tert-butyl, and $C_1$-$C_6$-alkyl is moreover by way of example n-pentyl, 1-methylbutyl, 2-methylbutyl, 3-methylbutyl, neopentyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{00}$-alkyl is moreover by way of example n-heptyl and n-octyl, pinacyl, n-nonyl, n-decyl, and $C_1$-$C_{34}$-alkyl is moreover by way of example n-dodecyl, n-tridecyl, n-tetradecyl, n-hexadecyl or n-octadecyl.

The same applies to the corresponding alkyl moiety by way of example in aralkyl, alkylaryl, alkylphenyl or alkylcarbonyl moieties. Alkylene moieties in the corresponding hydroxyalkyl or aralkyl or alkylaryl moieties are by way of example the alkylene moieties corresponding to the above alkyl moieties.

"Aryl" is a carbocyclic aromatic moiety having from 6 to 34 structural carbon atoms. The same applies to the aromatic portion of an arylalkyl moiety, also termed aralkyl moiety, and also to aryl constituents of more complex groups, e.g. arylcarbonyl moieties. Examples of "$C_6$-$C_{34}$-aryl" are phenyl, o-, p-, and m-tolyl, naphthyl, phenanthrenyl, anthracenyl and fluorenyl.

"Arylalkyl" and "Aralkyl" are respectively independently a straight-chain, cyclic, branched or unbranched alkyl moiety as defined above which can be substituted one or more times, or completely, by aryl moieties in accordance with above definition.

The above lists represent examples and are not to be interpreted as limiting.

For the purposes of the present invention, ppb and ppm mean parts by weight unless otherwise stated.

For the purposes of the present invention the stated % by weight values for components (A) to (H) are based respectively on the total weight of the moulding composition unless explicitly otherwise stated.

Preferred embodiments mentioned in the present invention can moreover be combined with one another, and are not to be regarded exclusively as isolated embodiments.

Component (A)

The moulding compositions of the invention comprise, as component (A), at least one polysiloxane-polycarbonate block cocondensate comprising siloxane blocks of the structure (1) and polycarbonate blocks.

For the siloxane blocks, preference is in particular given to structures of the formula (1) in which $R^2$ and $R^3$ are methyl. Particular preference is moreover given to structures of the formula (I) in which $R^1$ is H, p is 1 and X is isopropylidene.

It is preferable that the polycarbonate blocks present in the block cocondensate comprise structural units which derive from a diphenol of the general formula (2):

HO—Z—OH  (2)

where Z is an aromatic moiety having from 6 to 30 carbon atoms which can comprise one or more aromatic rings, can have substitution and can comprise aliphatic moieties or alkylaryl moieties or heteroatoms as bridging units.

It is preferable that Z in formula (2) is a moiety of the formula (2a)

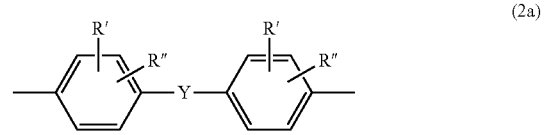

(2a)

in which

R' and R" are mutually independently H, $C_1$-$C_{18}$-alkyl, $C_1$-$C_{18}$-alkoxy, halogen such as Cl or Br, or respectively optionally substituted aryl or aralkyl, preferably H or $C_1$-$C_{12}$-alkyl, particularly preferably H or $C_1$-$C_8$-alkyl, and very particularly preferably H or methyl, and Y is —CO—, —O—, —S—, $C_1$- to $C_6$-alkylene, $C_2$- to $C_5$-alkylidene or $C_6$- to $C_{12}$-arylene which can optionally have been condensed with other aromatic rings comprising heteroatoms.

It is preferable that Y is $C_1$ to $C_5$-alkylene, $C_2$ to $C_5$-alkylidene, —O—, —SO—, —CO—, —S—, —$SO_2$—, isopropylidene or oxygen, in particular isopropylidene.

Examples of suitable diphenols of the formula (2) are hydroquinone, resorcinol, bis(hydroxyphenyl)alkanes, bis (hydroxyphenyl) sulphides, bis(hydroxyphenyl) ethers, bis (hydroxyphenyl) ketones, bis(hydroxyphenyl) sulphones, bis(hydroxyphenyl) sulphoxides, α,α'-bis(hydroxyphenyl)

diisopropylbenzenes, and ring-alkylated, other alkylated, and ring-halogenated compounds derived therefrom.

Preference is further given to the following diphenols of the formula (2): 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl, 4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane and 1,3-bis[2-(3,5-dimethyl-4-hydroxyphenyl)-2-propyl]benzene.

Particularly preferred diphenols of the formula (2) are 2,2-bis(4-hydroxyphenyl)propane (BPA), and 2,2-bis(3-methyl, 4-hydroxyphenyl)propane.

The polysiloxane-polycarbonate block cocondensates present as component (A) in the invention can be produced by reacting hydroxyaryloxy-terminated siloxanes of the formula (3)

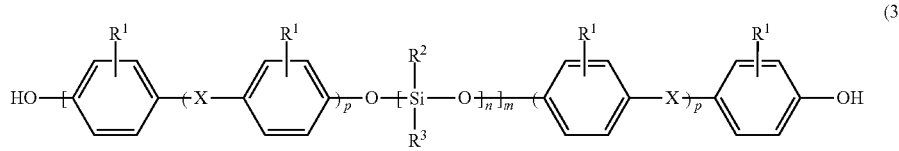

(3)

in which $R^1$, $R^2$ and $R^3$, X, n, m and p are as already defined for the formula (1), with conventional aromatic polycarbonates in the melt at temperatures of from 280° C. to 400° C., preferably from 300° C. to 390° C., more preferably from 320° C. to 380° C. and very particularly preferably from 330° C. to 370° C., and pressures of from 0.001 mbar to 50 mbar, preferably from 0.005 mbar to 40 mbar, with particular preference from 0.02 to 30 mbar and very particularly preferably from 0.03 to 5 mbar, preferably in the presence of a catalyst.

The hydroxyaryloxy-terminated siloxanes of the formula (3) can be obtained in accordance with the process described in US 2013/0267665 A1.

It is preferable that the polysiloxane-polycarbonate block cocondensates of the invention are produced by using siloxanes of the formula (3) with molar mass from 3000 to 20000 g/mol, particularly from 3500 to 15000 g/mol, determined by means of gel permeation chromatography and BPA standard.

For the purposes of the present invention, polycarbonates are not only homopolycarbonates but also copolycarbonates (another term used to cover both of these being (co)polycarbonates). As is known, these can be linear or branched. The polycarbonates can be produced in a known manner by the melt transesterification process or the interfacial process.

It is preferable that the polysiloxane-polycarbonate block cocondensate of the invention is produced by using polycarbonates with molar masses from 16000 to 28000 g/mol, particularly from 17000 to 27000 g/mol and with particular preference from 18000 to 26500 g/mol (measured using BPA standard). It is preferable that the content of phenolic OH groups in these polycarbonates is from 250 ppm to 1000 ppm, preferably from 300 to 900 ppm, and in particular from 350 to 800 ppm.

In particular, polycarbonates based on bisphenol A are used. It is very particularly preferable that these polycarbonates comprise phenol as terminal group. Polycarbonates particularly suitable for the production of the block cocondensates of the invention here are those produced by the melt transesterification process. Very particular preference is given to polycarbonates for which the production process is described in DE 102008019503.

In one preferred embodiment of the moulding compositions of the invention, the polysiloxane-polycarbonate block cocondensate comprises one or more transposition structures of the formulae (I) to (IV)

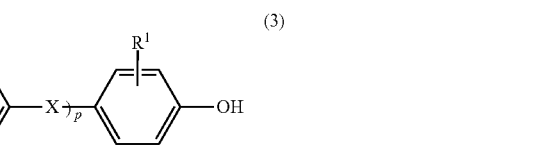

(I)

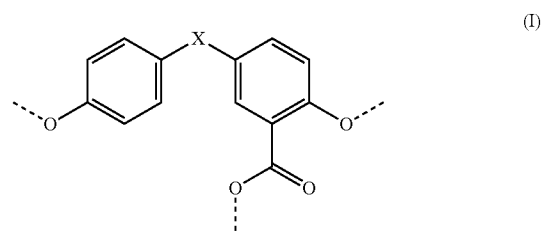

(II)

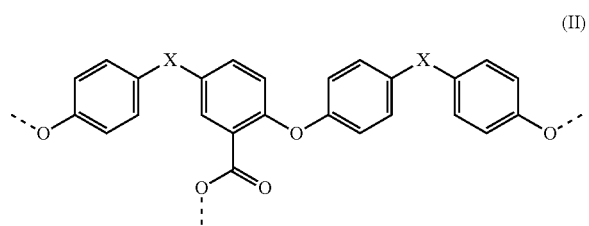

(III)

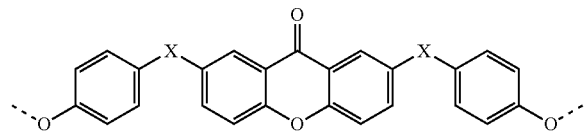

(IV)

where the phenyl rings can be unsubstituted or mutually independently mono- or disubstituted with $C_1$ to $C_8$-alkyl and/or halogen, preferably $C_1$ to $C_4$-alkyl, particularly preferably methyl, but can be preferably unsubstituted, X is a single bond, $C_1$ to $C_6$-alkylene, $C_2$ to $C_5$-alkylidene or $C_5$ to $C_6$-cycloalkylidene, preferably a single bond or $C_1$ to $C_4$-alkylene and with particular preference isopropylidene, and the linkages indicated by --- in the structural units (I) to (IV) are respectively part of a carboxy group;

and where the total quantity of the structural units (I) to (IV) is preferably from 50 to 2000 ppm, particularly preferably from 50 to 1000 ppm, with particular preference from 80 to 850 ppm (determined after hydrolysis, based on the polycarbonate present in the composition).

The transposition structures—or at least one of these structures—(I) to (IV) here have been incorporated into the polymer chain of the block cocondensate, preferably into the polycarbonate blocks.

The quantity of the transposition structures is determined by complete suponification of the respective block cocondensate, thus forming the corresponding degradation products of the formulae (Ia) to (IVa), the quantity of which is determined by HPLC. (An example of a method that can be used for this is as follows: The polycarbonate sample is suponified by using sodium methanolate at reflux. The solution is acidified and evaporated to dryness. The residue after drying is dissolved in acetonitrile, and the phenolic compounds of the formula (Ia) to (IVa) are determined by means of HPLC with UV detection.

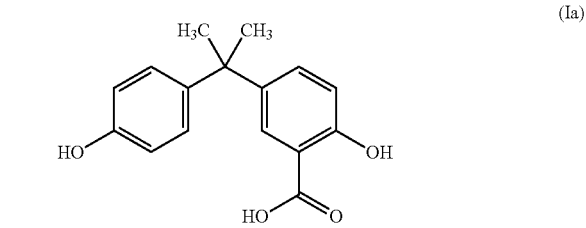

(Ia)

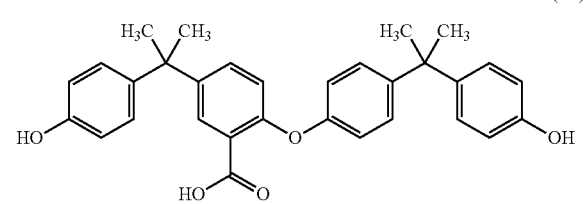

(IIa)

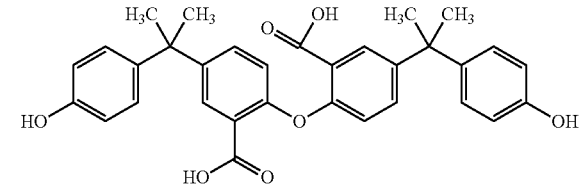

(IIIa)

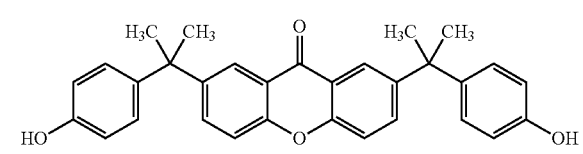

(IVa)

It is preferable that the quantity of the compound of the formula (Ia) liberated here is from 20 to 800 ppm, particularly from 25 to 700 ppm and in particular from 30 to 500 ppm.

It is preferable that the quantity of the compound of the formula (IIa) liberated here is from 0 (i.e. below the detection limit of 10 ppm) to 100 ppm, particularly from 0 to 80 ppm and in particular from 0 to 50 ppm.

The quantity of the compound of the formula (IIIa) liberated here is preferably from 0 (i.e. below the detection limit of 10 ppm) to 800 ppm, more preferably from 10 to 700 ppm and particularly preferably from 20 to 600 ppm, and very particularly preferably from 30 to 350 ppm.

It is preferable that the quantity of the compound of the formula (IVa) liberated here is from 0 (i.e. below the detection limit of 10 ppm) to 300 ppm, particularly from 5 to 250 ppm and in particular from 10 to 200 ppm.

For reasons of simplicity, the quantity of the structures of the formulae (I) to (IV) is equated to the quantity of the compounds of the formulae (Ia) to (IVa) liberated.

The production of polycarbonates comprising the structural elements (I) to (IV) is known from DE 102008019503.

The relative solution viscosity of the polysiloxane-polycarbonate block cocondensate of the invention is preferably from 1.26 to 1.40, particularly preferably from 1.27 to 1.38, and very particularly preferably from 1.28 to 1.35, determined via measurement of the relative solution viscosity in dichloromethane at a concentration of 5 g/l at 25° C. with an Ubbelohde viscometer.

The weight-average molar mass of the polysiloxane-polycarbonate block cocondensate of the invention is preferably from 26000 to 40000 g/mol, particularly preferably from 27000 to 38000 g/mol, and very particularly preferably from 28000 to 35000 g/mol, determined via measurement of the relative solution viscosity in dichloromethane at a concentration of 5 g/l at 25° C. with an Ubbelohde viscometer.

The quantity of polysiloxane-polycarbonate block cocondensate in the moulding compositions of the invention is preferably at least 50% by weight, particularly preferably at least 60% by weight, very particularly preferably at least 75% by weight.

It is preferable that the content of siloxane blocks of the structure (1) is from 2 to 20% by weight, based on the total weight of the moulding compositions.

The values for n and m in the siloxane blocks of the structure (1) can be determined with the aid of $^1H$ NMR spectroscopy or $^{29}Si$ NMR spectroscopy.

Component (B)

The moulding compositions of the invention comprise, as component (B), polytetrafluoroethylene (PTFE) or polytetrafluoroethylene blends (PTFE blends) which comprise from 30 to 70% by weight of polytetrafluoroethylene (based on the PTFE blend).

For the purposes of the invention, suitable PTFE blends are any of the physical mixtures of PTFE with a laminar material which sheaths the PTFE chains and is compatible with polycarbonate/polyester carbonate and PTFE and does not alter the fibril structure of the PTFE chains within the sheathing material. Examples of suitable substances are polyvinyl derivatives, preferably styrene-acrylonitrile (SAN) and polyacrylates. Proportions of PTFE present in these blends are from 30 to 70% by weight, preferably from 40 to 60% by weight, particularly preferably from 40 to 55% by weight. These blends are obtainable commercially by way of example with trade names Blendex® B449 (about 50% of PTFE and about 50%/0 of SAN [made of 80% of styrene and 20% of acrylonitrile]) from Chemtura or Metablen® A-3800 (about 40% of PTFE CAS 9002-84-0 and about 60% of methyl methacrylate/butyl acrylate copolymer CAS 25852-37-3) from Mitsubishi Rayon. The blends are produced by mixing a PTFE emulsion with an emulsion of the appropriate blend partner. The blend is obtained from the resultant mixture by a suitable process such as coagulation, freeze drying, spray drying, etc. The quantity of PTFE blends used in the invention is from 0.05 to 0.30% by weight, based on the moulding composition.

The quantity used of unblended PTFE in powder form is from 0.03 to 0.25% by weight, preferably from 0.05 to 0.20% by weight, based on the total weight of the moulding composition. The average particle diameter of suitable tetrafluoroethylene polymers that can be used in powder form is preferably from 100 to 1000 μm, their densities preferably being from 2.0 $g/cm^3$ to 2.3 $g/cm^3$. Suitable polytetrafluoroethylene powders are commercially available products and are supplied by way of example by DuPont with trade name Teflon®.

Component (C)

The moulding compositions of the invention comprise one or more sulphonic salts as component (C).

Preference is given to the alkali metal and alkaline earth metal salts of organic sulphonic acids such as diphenyl sulphone 3-sulphonic acid, diphenyl sulphone 3,3'-disulphonic acid, naphthalenetrisulphonic acid, para-toluenesulphonic acid, 2,5-dichlorobenzenesulphonic acid and 2,4,5-trichlorobenzenesulphonic acid.

Suitable sulphonic salts are in particular those of the general formulae (4) and (5):

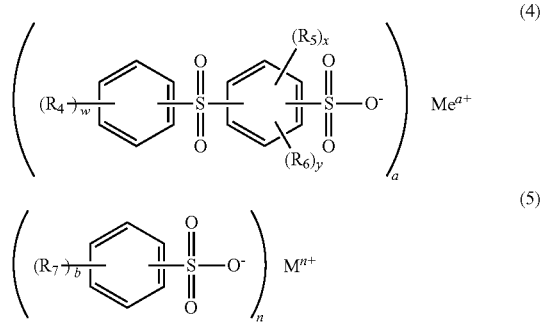

where $R_4$, $R_5$, $R_6$ and $R_7$ are respectively mutually independently a $C_1$ to $C_6$-alkyl moiety, particularly preferably chosen from the group consisting of methyl, ethyl, propyl and butyl;

Me and M are respectively a metal, preferably sodium or potassium;

a and n are 1, 2 or 3, b and w are integers from 0 to 5, and x and y are integers from 0 to 4.

Particularly preferred sulphonic salts of the formulae (4) and (5) are potassium diphenyl sulphone sulphonate and sodium p-toluenesulphonate.

Component (D)

In a preferred embodiment, the moulding compositions of the invention comprise one or more UV absorbers as component (D).

Suitable UV absorbers are described by way of example in EP 1 308 084 A1, DE 102007011069 A1 and DE 10311063 A1.

Particularly suitable ultraviolet absorbers are hydroxybenzotriazoles such as 2-(3',5'-bis(1,1-dimethylbenzyl)-2'-hydroxyphenyl)benzotriazole (Tinuvin® 234, BASF SE, Ludwigshafen), 2-(2'-hydroxy-5'-(tert-octyl)phenyl)benzotriazole (Tinuvin® 329, BASF SE, Ludwigshafen), 2-(2'-hydroxy-3'-(2-butyl)-5'-(tert-butyl)phenyl)benzotriazole (Tinuvin® 350, BASF SE, Ludwigshafen), bis(3-(2H-benzotriazolyl)-2-hydroxy-5-tert-octyl)methane, (Tinuvin® 360, BASF SE, Ludwigshafen), (2-(4,6-diphenyl-1,3,5-triazin-2-yl)-5-(hexyloxy)phenol (Tinuvin® 1577, BASF SE, Ludwigshafen), and the benzophenones 2,4-dihydroxybenzophenone (Chimasorb® 22, BASF SE, Ludwigshafen) and 2-hydroxy-4-(octyloxy)benzophenone (Chimassorb® 81, Ciba, Basle), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9CI) (Uvinul® 3030, BASF SE Ludwigshafen), 2-[2-hydroxy-4-(2-ethylhexyl)oxy]phenyl-4,6-di(4-phenyl)phenyl-1,3,5-triazine (Tinuvin® 1600, BASF SE, Ludwigshafen) and tetraethyl-2,2'-(1,4-phenylenedimethylidene)bismalonate (Hostavin® B-Cap, Clariant AG). It is also possible to use mixtures of these ultraviolet absorbers.

Preferred UV absorbers are in particular 2-(2'-hydroxy-5'-(tert-octyl)phenyl)benzotriazole (Tinuvin® 329, BASF SE, Ludwigshafen), bis(3-(2H-benzotriazolyl)-2-hydroxy-5-tert-octyl)methane, (Tinuvin® 360, BASF SE, Ludwigshafen) and 2-(3',5'-bis(1,1-dimethylbenzyl)-2'-hydroxyphenyl)benzotriazole (Tinuvin® 234, BASF SE, Ludwigshafen), and very particular preference is given to bis(1,1-dimethylbenzyl)-2'-hydroxyphenyl)benzotriazole.

The quantity used of the UV absorbers in the moulding compositions of the invention is preferably from 0.05% by weight to 10.00% by weight, particularly preferably from 0.10% by weight to 1.00% by weight, very particularly preferably from 0.10% by weight to 0.50% by weight and with particular preference from 0.10% by weight to 0.30% by weight.

Component (E)

In a further preferred embodiment the moulding compositions of the invention comprise one or more mould-release agents as component (E).

Suitable mould-release agents are esters of aliphatic long-chain carboxylic acids with mono- or polyhydric aliphatic and/or aromatic hydroxy compounds.

Aliphatic carboxylic esters used with particular preference are compounds of the general formula (6):

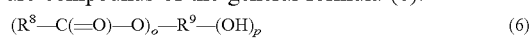

where
o is a number from 1 to 4,
p is a number from 0 to 3,
$R^8$ is an aliphatic, saturated or unsaturated, linear, cyclic or branched alkyl moiety, preferably $C_{12}$-$C_{30}$-alkyl moiety, and
$R^9$ is an alkylene moiety, preferably $C_2$-$C_{20}$-alkylene moiety, of a mono- to tetrahydric aliphatic alcohol $R^9$—$(OH)_{o+p}$.

In esters of polyhydric alcohols it is also possible that there are free, unesterified OH groups present.

Examples of suitable aliphatic carboxylic esters used in the invention are: glycerol monostearate, palmityl palmitate and stearyl stearate. It is also possible to use mixtures of various carboxylic esters of the formula (6). Preferred carboxylic esters used are esters of pentaerythritol, glycerol, trimethylolpropane, propanediol, stearyl alcohol, cetyl alcohol or myristyl alcohol with myristic, palmitic, stearic or montanic acid, and mixtures thereof. Particular preference is given to pentaerythritol tetrastearate, stearyl stearate and propanediol distearate and mixtures thereof, and most preference is given to pentaerythritol tetrastearate.

Examples of suitable aliphatic carboxylic esters used in the invention are glycerol monostearate, palmityl palmitate and stearyl stearate. It is also possible to use mixtures of various carboxylic esters.

Preferred carboxylic esters used are esters of pentacrythritol, glycerol, trimethylolpropane, propanediol, stearyl alcohol, cetyl alcohol or myristyl alcohol with myristic, palmitic, stearic or montanic acid, and mixtures thereof.

Particular preference is given to pentacrythritol tetrastearate, stearyl stearate and propanediol distearate, and mixtures thereof. Very particular preference is given to pentaerythrityl tetrastearate.

The concentrations preferably used of the mould-release agents are from 0.00% by weight to 1.00% by weight, preferably from 0.10% by weight to 0.75% by weight, particularly preferably from 0.15% by weight to 0.60% by weight, and very particularly preferably from 0.20% by weight to 0.50% by weight, based on the weight of the moulding composition.

Component (F)

In another preferred embodiment the moulding compositions of the invention comprise, as component (F), one or more heat stabilizers and/or processing stabilizers, preferably selected from the group of the phosphates, phosphines, phosphites and phenolic antioxidants and mixtures of these. The quantity preferably used of these is from 0.01% by weight to 0.10% by weight, based on the weight of the moulding compositions.

Suitable heat stabilizers are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl) pentacrythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butyl)phenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis (2,4-di-tert-butyl-6-methylphenyl) ethyl phosphite, 6-fluoro-2,4,8,10-tetra-tert-butyl-12-methyldibenzo[d,g]-1, 3,2-dioxaphosphocine, 2,2',2''-nitrilo[triethyltris(3,3',5,5'-tetra-tert-butyl-1,1'-biphenyl-2,2'-diyl) phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythritol diphosphite, triphenylphosphine (TPP), trialkylphenylphosphine, bisdiphenylphosphinoethane and trinaphthylphosphine.

It is particularly preferable to use triphenylphosphine (TPP), Irgafos® 168 (tris(2,4-di-tert-butylphenyl) phosphite), and tris(nonylphenyl) phosphite, or a mixture of these.

Other compounds that can be used as heat stabilizers are phenolic antioxidants such as alkylated monophenols, alkylated thioalkylphenols, hydroquinones, and alkylated hydroquinones. It is particularly preferable to use Irganox® 1010 (pentaerythritol 3-(4-hydroxy-3,5-di-tert-butylphenyl) propionate; CAS: 6683-19-8) and Irganox 1076® (2,6-di-tert-butyl-4-(octadecanoxycarbonylethyl)phenol).

It is also possible to use processing stabilizers based on phosphate. The phosphate here preferably has the following structure (7)

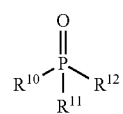

(7)

where $R^{10}$, $R^{11}$ and $R^{12}$ can be mutually independently H or identical or different linear, branched or cyclic alkyl moieties, preferably $C_1$-$C_{18}$-alkyl moieties.

Examples of suitable phosphates are mono-, di- and trihexyl phosphate, triisooctyl phosphate and trinonyl phosphate.

It is preferable to use triisooctyl phosphate (tris(2-ethylhexyl) phosphate) as phosphate. It is also possible to use mixtures of various mono-, di- and trialkyl phosphates.

Quantities that can be optionally used of the phosphates are less than 0.05% by weight, preferably from 0.00005% by weight to 0.05% by weight, particularly preferably from 0.0002 to 0.05% by weight, very particularly preferably from 0.0005% by weight to 0.03% by weight and in particular from 0.001 to 0.0120% by weight, based on the total weight of the moulding composition.

Component (G)

The moulding compositions of the invention can comprise other additives, quantities of which are preferably from 0.10 to 8.00% by weight, particularly preferably from 0.20 to 3.00% by weight.

The other additives are conventional polymer additives, examples being the following described in EP-A 0 839 623, WO-A 96/15102, EP-A 0 500 496 or "Plastics Additives Handbook", Hans Zweifel, 5th Edition 2000, Hanser Verlag, Munich: flame retardants, optical brighteners, flow improvers, inorganic pigments, colorants, mould-release agents and processing aids. The substances already disclosed as components (A) to (F) of the present invention are expressly not a constituent of component (G) here.

Further flame retardants can be used for the purposes of component (G). Examples of these flame retardants which can optionally be used in the moulding compositions of the invention are: sodium perfluorobutane sulphate, potassium perfluorobutane sulphate, sodium perfluoromethanesulphonate, potassium perfluoromethanesulphonate, sodium perfluorooctane sulphate, potassium perfluorooctane sulphate, sodium 2,5-dichlorobenzene sulphate, potassium 2,5-dichlorobenzene sulphate, sodium 2,4,5-trichlorobenzene sulphate, potassium 2,4,5-trichlorobenzene sulphate, sodium methylphosphonate, potassium methylphosphonate, sodium (2-phenylethylene)phosphonate, potassium (2-phenylethylene)phosphonate, sodium pentachlorobenzoate, potassium pentachlorobenzoate, sodium 2,4,6-trichlorobenzoate, potassium 2,4,6-trichlorobenzoate, sodium 2,4-dichlorobenzoate, potassium 2,4-dichlorobenzoate, lithium phenylphosphonate, sodium 2-formylbenzenesulphonate, potassium 2-formylbenzenesulphonate, sodium (N-benzenesulphonyl) benzenesulphonamide, potassium (N-benzenesulphonyl) benzenesulphonamide, trisodium or tripotassium hexafluoroaluminate, disodium or dipotassium hexafluorotitanate, disodium or dipotassium hexafluorosilicate, disodium or dipotassium hexafluorozirconate, sodium pyrophosphate, potassium pyrophosphate, sodium metaphosphate, potassium metaphosphate, sodium tetrafluoroborate, potassium tetrafluoroborate, sodium hexafluorophosphate, potassium hexafluorophosphate, sodium phosphate, potassium phosphate, lithium phosphate, N-(p-tolylsulphonyl)-p-toluenesulphimide potassium salt, N—(N'-benzylaminocarbonyl) sulphanylimide potassium salt. It is equally possible to use mixtures of the salts mentioned.

For the purposes of component (G), the moulding compositions preferably comprise one or more colorants, preferably comprising at least one chlorine-containing colorant.

"Colorants" for the purposes of the invention are dyes as well as pigments.

Examples of suitable colorants are sulphur-containing pigments such as cadmium red and cadmium yellow, iron-cyanide-based pigments such as Berlin blue, oxide pigments such as titanium dioxide, zinc oxide, red iron oxide, black iron oxide, chromium oxide, titanium yellow, zinc-iron-based brown, titanium-cobalt-based green, cobalt blue, copper-chromium-based black and copper-iron-based black, and chromium-based pigments such as chromium yellow, phthalocyanine-derived dyes such as copper-phthalocyanine blue and copper phthalocyanine green, condensed polycyclic dyes and pigments such as azo-based systems (e.g. nickel azo yellow), sulphur-indigo dyes, perinone-based, perylene-based, quinacridone-derived, dioxazine-based, isoindolinone-based, and quinophthalone-derived derivatives, anthraquinone-based, heterocyclic systems.

Specific examples of commercially available products are MACROLEX® Blue RR, MACROLEX® Violet 3R, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogen® Blue and Heliogen® Green (BASF SE, Germany).

Among these, preference is given to cyanine derivatives, quinoline derivatives, anthraquinone derivatives, phthalocyanine derivatives and perinone derivatives.

Chlorinated solvents can be used for the purposes of component (G). Suitable chlorinated solvents are chlorinated haloalkanes and halogenated aromatics.

Component (H)

The moulding compositions of the invention can moreover comprise, as component (H), one or more (co)polycarbonates which do not have any siloxane units.

Materials suitable for this are not only homopolycarbonates but also copolycarbonates. As is known, these can be linear or branched. The polycarbonates can be produced in a known manner by the melt transesterification process or the interfacial process.

Particular preference is given to homo- and copolycarbonates having structural units which derive from one or more diphenols of the general formula (2), in particular of the general formula (2a), and very particularly preferably bisphenol A, these being as already described in the context of component (A).

Very particular preference is given to homopolycarbonates based on bisphenol A.

Chlorine Content

In accordance with the invention, the moulding compositions of the invention have a chlorine content from 10 to 1000 ppm, preferably 20 to 800 ppm, and especially preferably from 50 to 500 ppm.

Surprisingly it has been ascertained that the moulding compositions of the invention must have such a chlorine content in order at the same time to exhibit good fire performance and excellent low-temperature impact toughness.

There are a variety of measures via which the chlorine content can be adjusted.

For example, there are chlorine-containing flame retardants available. Using such compounds, however, is not preferred.

The chlorine content may also be modified using certain chlorine-containing salts.

One preferred embodiment of the moulding compositions of the invention sees the chlorine content adjusted via a chlorine-containing colorant which is present as part of component (G).

Accordingly, the chlorine content can be adjusted via a chlorine-containing pigment that is present as part of component (G), such as chlorine-containing titanium dioxide, for example. A pigment preferred in this way is titanium dioxide as prepared by the chloride process. It is used preferably in an amount from 0.20 to 8.00% by weight, based on the moulding composition.

The chlorine content may accordingly be adjusted, moreover via chlorine-containing colorants that are present as part of component (G), more particularly chlorinated aromatics such as Pigment Green 7 (a polychlorocopper phthalocyanine; a chlorine-containing phthalocyanine dye) or Solvent Red 135 (8,9,10,11-tetrachloro-12h-phthaloperin-12-one; a chlorine-containing perinone dye). Chlorinated aromatics are used preferably in an amount from 0.01 to 0.50% by weight, based on the moulding composition.

The chlorine content may additionally be modified via chlorinated solvent fractions present as part of component (G) in the moulding compositions. Examples of such solvents include chlorinated haloalkanes or halogenated aromatics.

Production of the Moulding Compositions

The moulding compositions of the invention comprising components (A) to (C) and optionally one or more of components (D) to (H) are produced by familiar incorporation processes by combining, mixing and homogenizing the individual constituents, and in particular the homogenization here preferably takes place in the melt with exposure to shear forces. It is optionally possible to combine and mix the materials before melt homogenization with use of powder premixes.

It is also possible to use premixes produced from solutions of the mixture components in suitable solvents, where homogenization is optionally carried out in solution and the solvent is then removed.

In particular here it is possible to introduce the components of the moulding compositions of the invention via known processes or in the form of masterbatch.

It is possible here that the individual components of the moulding compositions are combined and mixed in conventional devices such as screw-based extruders (for example ZSK twin-screw extruders), kneaders, Brabender mixers or Banbury mixers, homogenized and then extruded. The extrudate can be cooled and comminuted. It is also possible to premix individual components and then to add the remaining starting materials individually and/or likewise in a mixture.

The moulding compositions of the invention can be processed to give products or mouldings by, for example, first extruding the moulding compositions as described to give pellets, and processing these pellets in a known manner via suitable processes to give various products or mouldings.

The moulding compositions of the invention can be converted here by way of example via hot pressing, spinning, blow moulding, thermoforming, extrusion or injection moulding to give products or mouldings, moulded articles such as toy parts, fibres, films, tapes, sheets such as solid sheets, twin- or multiwall sheets or corrugated sheets, vessels, pipes or other profiles. Multilayer systems can also be used. Materials can be applied at the same time as, or immediately after, the shaping of the main structure, e.g. via coextrusion or multicomponent injection moulding. However, it is also possible to apply materials to the main structure after it has been shaped, e.g. via lamination with a film or via coating with a solution.

Sheets made of base layer and of optional outer layer(s) (multilayer systems) can be produced via (co)extrusion, direct skinning, direct coating, insert moulding, in-mould coating of films, or other suitable processes known to the person skilled in the art.

For the extrusion process, the moulding composition optionally pretreated, for example by drying, is introduced into the extruder and is melted in the plastification system of the extruder. The plastics melt is then forced through a slot die or a double-walled die and thus shaped, converted to the desired final shape in the nip of a polishing calender, and its shape is then fixed by cooling of alternate sides on polishing rolls and ambient-air cooling. The temperatures set are those required for the extrusion of the composition; it is usually possible here to follow the manufacturer's instructions. If by way of example the moulding compositions comprise polycarbonates with high melt viscosity, these are normally processed at melt temperatures of from 260° C. to 350° C., and the temperatures of the plastifying barrel, and also the die temperatures, are set accordingly.

By use of one or more ancillary extruders and of a multiple-manifold die, or optionally suitable melt adapters upstream of a slot die, thermoplastic melts of different composition can be mutually superposed, and multilayer sheets or films can thus be produced. (For the coextrusion process see by way of example EP-A 0 110 221, EP-A 0 110 238 and EP-A 0 716 919, and for details of the adapter and die process see Johannaber/Ast: "Kunststoff-Maschinenführer" [Guide to plastics machinery], Hanser Veriag, 2000 and Gesellschaft Kunststofflechnik: "Coextrudierte Folien und Platten: Zukunftsperspektiven, Anforderungen, Anlagen und Herstellung, Qualitätssicherung" [Coextruded films and sheets: outlook, requirements, plant and production processes, quality assurance], VDI-Verlag, 1990.)

It is also possible to produce mouldings with the thermoplastic substrates described above via injection moulding. The processes for this are known and are described in "Handbuch Spritzgiessen" [Injection moulding handbook], Friedrich Johannnaber/Walter Michaeli, Munich; Vienna: Hanser, 2001, ISBN 3-446-15632-1 and "Anleitung zum Bau von Spritzgiesswerkzeugen" [Construction of injection moulds], Menges/Michaeli/Mohren, Munich, Vienna: Hanser, 1999, ISBN 3-446-21258-2.

Injection moulding is a forming process used in plastics processing.

This process can be cost-effective in producing large numbers of ready-to-use mouldings. With an injection-moulding machine this is achieved by plastifying the respective material, or the moulding composition, in an injection unit and injecting it into an injection mould. The cavity of the mould determines the shape and surface structure of the finished component.

Injection moulding here encompasses all injection-moulding processes inclusive of multicomponent injection moulding and injection-compression moulding processes.

Plastics mouldings are produced by using the variants of injection moulding and injection-compression moulding that are known in plastics processing. Conventional injection-moulding processes not utilizing injection-compression-moulding technology are used in particular to produce relatively small injection mouldings where flow paths are short and operations can use moderate injection pressures. In the conventional injection-moulding process the plastics composition is injected into a cavity formed between two closed fixed mould plates, and solidifies in the said cavity.

Injection-compression-moulding processes differ from conventional injection-moulding processes in that the injection and/or solidification procedure involves mould plate movement. In the known injection-moulding process the mould plates have been somewhat opened before the injection procedure, in order to compensate for the shrinkage occurring during subsequent solidification and to reduce the required injection pressure. A pre-enlarged cavity is therefore present at the start of the injection procedure. Flash faces of the mould also guarantee that the pre-enlarged cavity is sufficiently leakproof, even when the mould plates have been somewhat opened. The plastics composition is injected into the said pre-enlarged cavity, and during this procedure or subsequently is subjected to pressure as the mould moves towards closure. Injection-compression-moulding technology is more complicated, but is preferred or sometimes essential in particular in the production of mouldings with large surface areas and thin walls, with long flow paths. This is the only way of reducing the injection pressures required for large mouldings. Injection-compression moulding can moreover avoid stresses and/or distortions in the injection moulding caused by high injection pressures. This is particularly important in the production of optical plastics products, for example glazing (windows) in motor vehicles, since optical plastics products have to comply with relatively stringent requirements for absence of stress.

Products, mouldings or moulded articles preferred in the invention are sheets, films, pipes, glazing, for example automobile windows, windows of rail vehicles and of aircraft, automobile sun roofs, safety glazing, roof-construction systems, glazing in buildings, lamp covers for the interior of vehicles and of buildings, lamp covers for the outdoor sector, e.g. covers for street lamps, visors, spectacles, extruded and solution-derived films for displays or electric motors, and also ski films, traffic-signal housings, traffic-signal covers, and traffic-signal lenses, comprising the moulding compositions of the invention. It is possible here to use not only solid sheets but also double- or multiple-wall sheets. The products of the invention can comprise, as other components of the products of the invention alongside the moulding compositions of the invention, by way of example parts made of other materials. By way of example, glazing systems can comprise gasket materials at the periphery of the glazing systems. Roof-construction systems can comprise by way of example metal components such as screws, metal pins or the like which can serve for the fastening or (in the case of folding or sliding roofs) guiding of the roof-construction elements. It is moreover possible to bond other materials to the moulding compositions of the invention, e.g. by the 2-component injection-moulding process. It is therefore possible that the appropriate component with IR-absorbent properties is provided with a periphery which by way of example serves for adhesive bonding.

The invention is described below with reference to embodiments, and unless otherwise stated the determination methods described here are used for all corresponding variables in the present invention.

EXAMPLES

Materials for the production of the compositions and of corresponding test samples:
Component (A)
Polysiloxane-polycarbonate block cocondensate (also termed Si—PC below) comprising bisphenol A homopolycarbonate blocks and siloxane blocks of the general formula (1) where $R^1$=H, $R^2$, $R^3$=methyl, p=0, n is in the range from 30 to 35 and m is in the range from 3.5 to 4.0. The relative solution viscosity of the block cocondensate is 1.30 (determined at a concentration of 5 g/l in dichloromethane at 25° C. with an Ubbelohde viscometer).

The block cocondensate was produced by a melt transesterification process from a bisphenol A homopolycarbonate and a siloxane. The following components were used here:

Polycarbonate component: Linear bisphenol-A homopolycarbonate having terminal groups based on phenol with melt volume rate MVR about 59 cm$^3$/10 min (measured at 300° C. with 1.2 kg loading in accordance with ISO 1033), produced by a melt transesterification process as described in DE 102008019503. This component comprises transposition structures of the formulae (I), (II), (III) and (IV). The content of transposition structures can be determined by determining the quantities of the corresponding degradation products (Ia) to (IVa) after use of sodium methanolate for complete suponification at reflux. The degradation products found by means of HPLC with UV detection were the following: (Ia): 142 ppm; (IIa): <10 ppm, (IIIa): <10 ppm, (IVa): 23 ppm.

Siloxane component: Hydroquinone-terminated polydimethylsiloxane of the formula (I) (i.e. $R^1$=H, $R^2$=methyl, p=0), where n is in the range from 30 to 35 and m is in the range from 3.5 to 4.0; produced as described in US 2013/0267665 A1, Example 1.

The block cocondensate made of the polycarbonate component and of the siloxane component is produced by way of a reactive extrusion process:

BRIEF DESCRIPTION OF THE FIGURE

A diagram of the experimental set-up can be found in the FIGURE.

The FIGURE is a diagram of the production of the siloxane-containing block cocondensates. Polycarbonate and a catalyst masterbatch (see below) are metered by way of the gravimetric feeds (4) and (5) into the twin-screw extruder (1). The extruder (ZSE 27 MAXX from Leistritz Extrusionstechnik GmbH, Nuremberg) is a corotating twin-screw extruder with vacuum zones for removal of the vapours. The extruder is composed of 11 barrel sections (a to k)—see the FIGURE. In barrel section a polycarbonate and catalyst masterbatch are added, and in barrel section b and c these components are melted. In barrel section d the liquid silicone component is added. Barrel sections e and f serve to mix the liquid silicone component into the material. Barrel sections g, h, i and j have vents for removing the condensation products. Barrel sections g and h are part of the first vacuum stage, and barrel sections i and j are part of the second vacuum stage. The vacuum in the first vacuum stage comprised an absolute pressure of from 250 to 500 mbar. The vacuum in the second vacuum stage comprised a pressure of less than 1 mbar. The siloxane is provided in a tank (6) and added to the extruder by way of a metering pump (7). The vacuum is generated by way of 2 vacuum pumps (8). The vapours are removed from the extruder and collected (9) in 2 condensers. The resultant devolatilized melt is conducted by way of a line from barrel section k of the twin-screw extruder to a high-viscosity reactor (2).

The high-viscosity reactor (2) is a self-cleaning apparatus with two contra-rotating, horizontal rotors arranged with parallel axes. The structure is described in FIG. 7 of the European Patent Application EP0460466. The rotor diameter of the machine used is 187 mm, with length 924 mm. The volume of the entire space within the reactor is 44.6 litres. Attached to the high-viscosity reactor there is likewise a vacuum pump (8) and a condenser (9). The vacuum applied to the high-viscosity reactor comprises a pressure of from 0.1 to 5 mbar. After conclusion of the reaction the block cocondensate is discharged by way of a discharge screw and then pelletized (by way of water bath (10) and pelletizer (11)). The molecular weight of the block cocondensate is controlled by way of the throughput. The throughput in the extruder/high-viscosity reactor combination is adjusted in such a way to give a solution viscosity of eta rel 1.30 for the block cocondensate (determined at a concentration of 5 g/l in dichloromethane at 25° C. with an Ubbelohde viscometer).

The catalyst masterbatch required for the production of the block cocondensate is produced as follows: The catalyst is tetraphenylphosphonium phenoxide from Rhein Chemie Rheinau GmbH (Mannheim, Germany). The catalyst is used in the form of a masterbatch. Tetraphenylphosphonium phenoxide is used in the form of Co-crystal with phenol and comprises about 70% of tetraphenylphosphonium phenoxide. The content values specified below relate to the product from Rhein Chemie (i.e. in the form of the co-crystal with phenol).

The masterbatch used takes the form of a 0.25% dilution. This is produced by mixing 4982 g of polycarbonate with 18 g of tetraphenylphosphonium phenoxide (in the form described above) in a gym-wheel mixer for 30 minutes. The metering ratio for the masterbatch is 1:10, and the catalyst content is therefore 0.025% by weight, based on the polycarbonate used.
Component (B)
PTFE powder CFP 6000 from DuPont with average particle diameter about 490 μm and bulk density about 460 g/L. Blendex B449 (about 50% of PTFE and about 50% of SAN [made of 80% of styrene and 20% of acrylonitrile] from Chemtura.

Component (C)
Potassium diphenyl sulphone sulphonate: product name KSS-FR from Brenntag GmbH, Germany.
Component (D)
Tinuvin® 234 (bis(1,1-dimethylbenzyl)-2'-hydroxyphenyl)benzotriazole, BASF SE, Ludwigshafen) is used as UV absorber.
Component (F)
Irgafos® 168 (tris(2,4-di-tert-butylphenyl)phosphite, CAS 31570-04-4, BASF SE, Ludwigshafen) is used as heat stabilizer.
Component (G)
Colorant
Carbon black (particle size about 17 nm) in the form of Black Pearls® 800 (CAS No. 1333-86-4) from Cabot Corp. is used as colorant.
Macrolex Red EG (Solvent Red 135, CAS No. 20749-68-2) from Lanxess AG, Leverkusen, is used as colorant.
Potassium perfluoro-1-butanesulphonate, obtainable commercially as Bayowet® C4 from Lanxess, Leverkusen, Germany, CAS No. 29420-49-3 is used as flame retardant which is not in accordance with the invention.
Component (H)
Linear bisphenol A homopolycarbonate having terminal groups based on phenol with melt volume rate MVR 6 cm$^3$/10 min (measured at 300° C. with 1.2 kg loading in accordance with ISO 1033), also referred to below as PC 1.

The additives were compounded in a Berstorff ZE25 twin-screw extruder from KrausMaffei at a barrel temperature of 260° C. and a melt temperature of 280° C. at rotation rate 150 rpm, the quantities of additives being those shown in the Examples.

The pellets were dried in vacuo for 3 hours at 120° C. and then processed in an Arburg 370 with a 25 injection unit injection-moulding machine at a melt temperature of 300° C. and a mould temperature of 80° C. to give appropriate mouldings. The starting materials used here are those stated in Table 1, at the stated concentrations.

Examples 1 and 2 are inventive examples; Examples 3 to 6 are comparative examples.

Melt volume rate (MVR) is determined in accordance with ISO 1133 (at 300° C.; 1.2 kg).

Fire performance is measured in accordance with UL 94V on specimens measuring 127 mm×12.7 mm×3.0 mm and on specimens measuring 127×12.7×1.5 mm.

Two sets of in each case 5 UL test samples of the thickness stated above were then tested by a method based on UL 94V. One set was tested after 48 hours of storage at 50% rel. humidity and 23° C. Another set was tested after 7 days of storage at 70° C. in an oven. (The total number of UL test samples tested in each case was 10.)

Mechanical properties are determined on, in each case, 10 test specimens measuring 80×10×4 and 80×10×3 mm (see Table 2 for thickness of the test specimens) (Izod notched impact measured in accordance with ISO 180/1A; 23° C. and −30° C.).

Inventive Examples 1 and 2 and Comparative Examples 3 to 6 are produced with the additives and raw materials stated in Table 1 at the respective concentrations stated (in % by weight) under the conditions stated above.

TABLE 1

| Component | Example 1 | Example 2 | Example 3 (Comparison) | Example 4 (Comparison) | Example 5 (Comparison) | Example 6 (Comparison) |
|---|---|---|---|---|---|---|
| (A) Si—PC | 95 | 95 | 95 | 95 | 95 | 95 |
| (H) PC 1 | 3.78 | 3.85 | 3.43 | 4.08 | 3.83 | 3.83 |
| (B) Blendex | 0.15 | — | 0.60 | 0.15 | 0.40 | — |
| (B) PTFE powder | — | 0.08 | — | — | — | 0.3 |
| (C) | 0.40 | 0.40 | 0.30 | 0.40 | 0.40 | 0.30 |
| (D) | 0.27 | 0.27 | 0.27 | 0.27 | 0.27 | 0.27 |
| (F) | 0.10 | 0.10 | 0.10 | 0.10 | 0.10 | 0.10 |
| G) Carbon black | 0.20 | 0.20 | 0.20 | — | 0.20 | 0.20 |
| G) Macrolex Red EG | 0.10 | 0.10 | 0.10 | — | 0.10 | — |
| G) Potassium perfluoro-1-butanesulphonate | — | — | — | — | 0.10 | — |

TABLE 2

| | Ex. 1 | Ex. 2 | Ex.3 (Comparison) | Ex. 4 (Comparison) | Ex. 5 (Comparison) | Ex. 6 (Comparison) |
|---|---|---|---|---|---|---|
| Chlorine content (ppm) | 250 | 260 | 220 | 2 | 170 | 4 |
| Izod notched 23° C. [kJ/m$^2$] | 64 d * | 63 d * | — | 64 d * | 68 d | — |
| Izod notched −30° C. [kJ/m$^2$] | 40 d * | 43 d * | 25 b | 46 d −40° C. * | 4 Test specimens: 32 d 6 Test specimens: 26 b | 28 b |
| UL 3.0 mm | V0 | V0 | V0 | V0 | V0 | V0 |
| UL 1.5 mm | V0 | V0 | V1 | V1 | V1 | V0 |

*thickness of the test specimen in Izod notched impact test = 4 mm; b: brittle fracture in the Izod notched impact test; d: toughness behaviour in the Izod notched impact test; for examples 3, 5 and 6, the thickness of the test specimen in the Izod notched impact test = 3 mm.

It is seen that the examples according to the invention exhibit the combination of good fire performance and excellent low-temperature notched impact toughness, whereas the comparative examples, which have excessively low content of chlorine (Examples 4 and 6) or excessively high content of component B (Examples 3 and 5), exhibit weaknesses in fire behaviour and/or in the mechanical properties.

The invention claimed is:

1. A flame-retardant, thermoplastic moulding compositions comprising
   (A) at least one polysiloxane-polycarbonate block cocondensate comprising siloxane blocks of the structure (1)

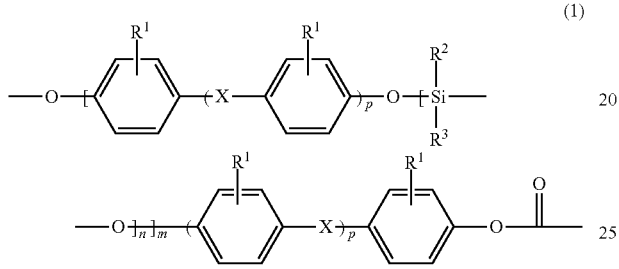

where
   $R^1$ is H, Cl, Br or $C_1$ to $C_4$-alkyl,
   $R^2$ and $R^3$ are selected mutually independently from aryl, $C_1$ to $C_{10}$-alkyl and $C_1$ to $C_{10}$-alkylaryl,
   X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene, which can have been condensed with another aromatic ring comprising heteroatoms,
   n is an average value from 1 to 500,
   m is an average value from 2 to 10 and
   p is 0 or 1;
   (B) from 0.03 to 0.25% by weight of polytetrafluoroethylene
   or from 0.05 to 0.30% by weight of polytetrafluoroethylene blends which comprise from 30 to 70% by weight of polytetrafluoroethylene, and
   (C) from 0.1 to 0.6% by weight of at least one sulphonic salt,
   wherein the moulding compositions have a chlorine content of from 10 to 1000 ppm, and
   wherein the at least one polysiloxane-polycarbonate block cocondensate optionally comprises one or more structures of the formulae (I), (II), (III) and (IV):

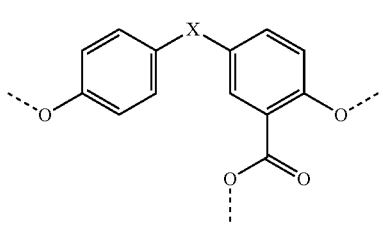

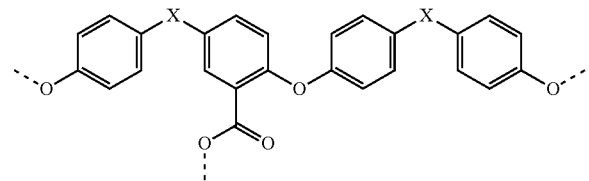

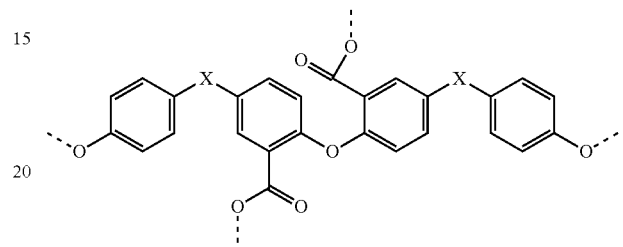

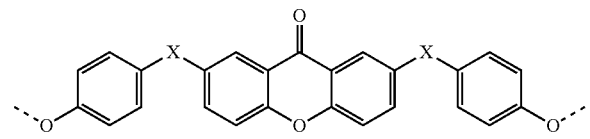

where
   the phenyl rings are unsubstituted or mutually independently mono- or disubstituted with $C_1$ to $C_8$-alkyl and/or halogen,
   X is a single bond, $C_1$ to $C_6$-alkylene, $C_2$ to $C_5$-alkylidene or $C_5$ to $C_6$-cycloalkylidene, and
   the linkages indicated by --- in the structural units (I) to (IV) are respectively part of a carboxy group.

2. The moulding composition according to claim 1, wherein one or more chlorine-containing colorants are present.

3. The moulding composition according to claim 2, wherein the moulding compositions comprise at least one chlorine-containing colorant from the class of the chlorinated aromatics and/or titanium oxide prepared by the chloride process.

4. The moulding composition according to claim 1, wherein the moulding compositions comprise at least one chlorine aromatic selected from the classes of the phthalocyanine dyes and perinone dyes.

5. The moulding composition according to claim 1, wherein polytetrafluoroethylene with average particle diameter from 100 to 1000 μm is present as component (B).

6. The moulding composition according to claim 1, wherein at least one polytetrafluoroethylene blend is present as component (B) in the moulding compositions, where the polytetrafluoroethylene blend comprises a polytetrafluoroethylene core and a coating made of at least one polyvinyl derivative.

7. The moulding composition according to claim 1, wherein at least one sulphonic salt of the general formulae (4) and (5) is present as component (C)

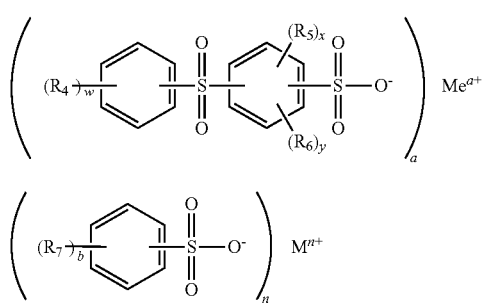

(4)

(5)

where
R$_4$, R$_5$, R$_6$ and R$_7$ are respectively mutually independently a C$_1$ to C$_6$-alkyl moiety,
Me and M are respectively a metal,
a and n are 1, 2 or 3,
b and w are integers from 0 to 5, and
x and y are integers from 0 to 4.

8. The moulding composition according to claim 1 composed of components (A), (B), (C) and
(D) from 0.00% by weight to 20.00% by weight of one or more UV absorbers;
(E) from 0.00% by weight to 1.00% by weight of one or more mould-release agents;
(F) from 0.00% by weight to 0.20% by weight of one or more heat stabilizers and/or processing stabilizers;
(G) from 0.00 to 10.00% by weight of other additives which differ from components (B) to (F); and
(H) from 0.00% to 40.00% by weight of one or more (co)polycarbonates which do not have any siloxane units.

9. The moulding composition according to claim 1, wherein the quantity present of component A in the moulding compositions is at least 50% by weight.

10. The moulding composition according to claim 1, wherein the polysiloxane-polycarbonate block cocondensate comprises polycarbonate blocks based on bisphenol A.

11. The moulding composition according to claim 1, wherein the polysiloxane-polycarbonate block cocondensate comprises one or more structures of the formulae (I), (II), (III) and (IV):

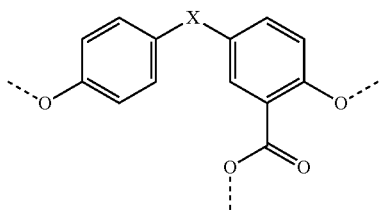
(I)

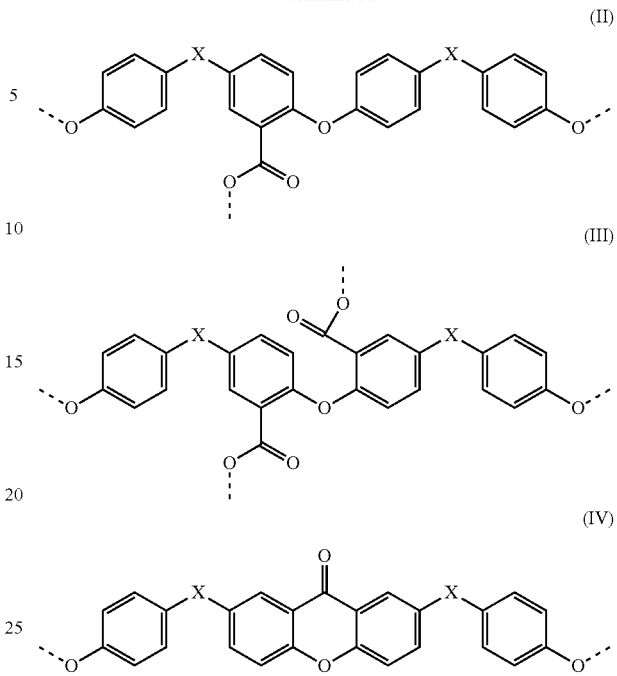

where
the phenyl rings are unsubstituted or mutually independently mono- or disubstituted with C$_1$ to C$_8$-alkyl and/or halogen,
X is a single bond, C$_1$ to C$_6$-alkylene, C$_2$ to C$_5$-alkylidene or C$_5$ to C$_6$-cycloalkylidene, and
the linkages indicated by --- in the structural units (I) to (IV) are respectively part of a carboxy group.

12. The moulding composition according to claim 1, wherein the content of siloxane blocks of the structure (1) is from 2 to 20% by weight, based on the total weight of the moulding compositions.

13. The moulding composition according to claim 1, wherein the energy absorbed in the Izod notched impact test at −30° C. on injection mouldings produced therefrom is at least 30 kJ/m², measured in accordance with ISO 180/1A on test specimens measuring 80×10×3 mm or 80×10×4 mm, and the UL 94 classification of said injection mouldings, for thickness 1.5 mm, is V-0.

14. The moulding composition according to claim 1, wherein the moulding compositions have a chlorine content of from 50 to 500 ppm.

* * * * *